(12) United States Patent
DeJesus

(10) Patent No.: US 9,541,060 B1
(45) Date of Patent: Jan. 10, 2017

(54) WINDMILL BLADE ASSEMBLY

(71) Applicant: Ben L. DeJesus, Carson, CA (US)

(72) Inventor: Ben L. DeJesus, Carson, CA (US)

( * ) Notice: Subject to any disclaimer, the term of this patent is extended or adjusted under 35 U.S.C. 154(b) by 823 days.

(21) Appl. No.: 13/906,561

(22) Filed: May 31, 2013

(51) Int. Cl.
*F03D 1/06* (2006.01)
*F03D 1/02* (2006.01)

(52) U.S. Cl.
CPC .............. *F03D 1/06* (2013.01); *F03D 1/025* (2013.01); *F03D 1/065* (2013.01); *F03D 1/0675* (2013.01); *F03D 1/0691* (2013.01)

(58) Field of Classification Search
CPC .............. F03D 1/02; F03D 1/025; F03D 1/06; F03D 1/065; F03D 1/0658; F03D 1/0666; F03D 1/0675; F03D 1/0691
USPC .............. 416/175, 198 R, 212 R, 19
See application file for complete search history.

(56) References Cited

U.S. PATENT DOCUMENTS

| | | | | |
|---|---|---|---|---|
| 118,325 | A * | 8/1871 | Zahn .................. | F01D 5/06 416/198 R |
| 1,121,335 | A * | 12/1914 | Dilg .................. | F04D 29/34 416/212 R |
| 1,260,562 | A * | 3/1918 | McIntosh .............. | F04D 29/34 126/214 R |
| 2,203,672 | A | 6/1940 | Chester | |
| 2,978,233 | A * | 4/1961 | Davey ................ | B01F 7/00241 366/262 |
| 3,333,831 | A | 8/1967 | Chapman | |
| 4,480,926 | A * | 11/1984 | Lattery, Jr. .......... | A47J 43/044 366/130 |
| 4,514,146 | A * | 4/1985 | Nojiri ................ | B63H 1/14 416/175 |
| 5,295,793 | A | 3/1994 | Belden | |
| 6,106,232 | A * | 8/2000 | Wagner ............... | B63H 1/14 416/175 |
| 7,985,052 | B2 * | 7/2011 | Vettese ............... | F03D 1/025 416/210 R |

FOREIGN PATENT DOCUMENTS

| | | | | |
|---|---|---|---|---|
| GB | 1598690 A | * | 9/1981 | ............ B21D 53/78 |
| RU | WO 2007097659 A1 | * | 8/2007 | ............ F03B 17/061 |

* cited by examiner

*Primary Examiner* — Richard Edgar
*Assistant Examiner* — Jesse Prager
(74) *Attorney, Agent, or Firm* — Morland C. Fischer

(57) ABSTRACT

A windmill blade assembly that is rotated in response to the wind. Each of a first and a second blade member has first and opposite ends and a hub mounting hole located between the ends. The first blade member is located above the second blade member such that the hub mounting holes thereof are axially aligned to receive a hub therethrough. The first and second blade members are turned along the hub or bent so as to provide a pitch that is aerodynamically configured to cause the rotatable blade assembly to spin. The windmill blade assembly is connected by a correspondingly rotatable shaft which extends from the hub thereof to an electrical power generator.

12 Claims, 9 Drawing Sheets

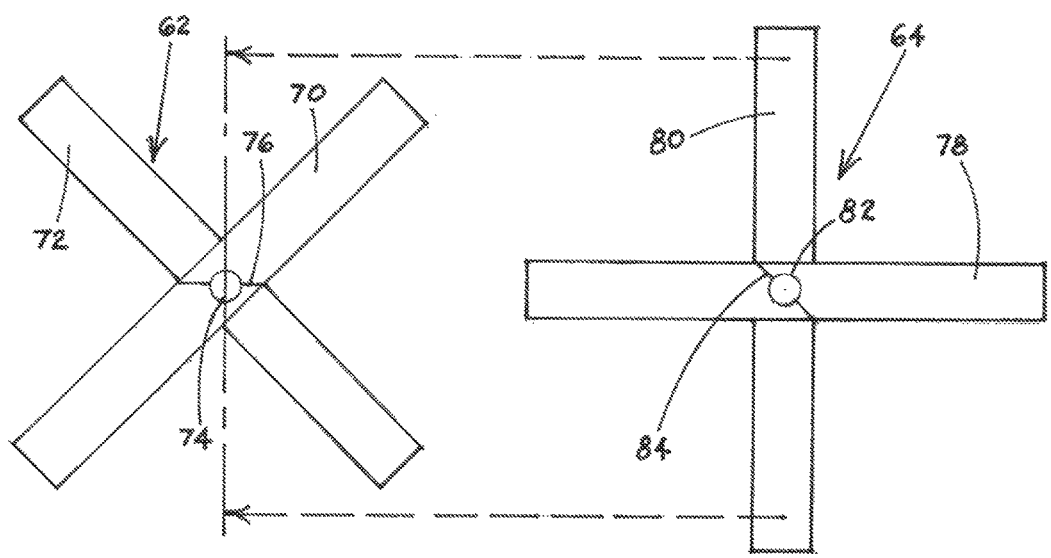

WINDMILL BLADE ASSEMBLY

BACKGROUND OF THE INVENTION

1. Field of the Invention

This invention relates to a rotatable windmill blade assembly that is rotated in response to the wind. The rotatable windmill blade assembly is connected by means of a correspondingly rotatable shaft to, for example, an electrical power generator.

2. Background Art

Clean, efficient and low-cost sources of energy are regularly being sought by individuals and government agencies alike. By way of example, attempts have been made to harness the wind to produce electricity to power individual households or communities. To this end, arrays of tall windmills have been erected in out-of-doors areas where regular air currents are prevalent. The windmills have rotatable propellers that spin in response to the wind. Each windmill functions as a turbine, whereby a rotation of the propeller thereof results in the generation of electricity.

The efficiency of the windmill and the power output of the turbine are dictated to a large extent by the size and pitch of the blades of the rotatable propeller. The blades of the propeller typically project outwardly from a common hub such that all of the blades are coplanar. It would be desirable to vary the pitch of the blades of a rotatable windmill blade assembly to optimize the aerodynamic characteristics thereof in order to maximize the responsiveness of the blades to wind flow, whereby the blade assembly can spin at higher speeds so that the turbine can correspondingly generate electricity more efficiently.

SUMMARY OF THE INVENTION

A rotatable blade assembly having a plurality of blades that rotate in response to the wind. The rotatable blade assembly has particular application to be connected to a shaft of an outdoors windmill which functions to generate electricity as the blades of the assembly spin in the wind. According to a first preferred embodiment for a rotatable windmill blade assembly, a pair of opposing L-shaped blade members slide into engagement with one another. Each L-shaped blade member has a pair of intersecting blade arms that are aligned perpendicular to one another. Each blade member also has a hub mounting hole and a coupling slot which communicates with the hub mounting hole at the intersection of the blade arms. The blade members are pushed towards one another so as to slide together via the respective coupling slots until the coupling holes thereof are axially aligned to receive a hub therethrough for being coupled to the shaft of the windmill or the like. Prior to securing (e.g., welding) the pair of L-shaped blade members to the hub, the blade members are turned rotative to one another along the hub. In this case, one blade arm from a first of the pair of blade members angles upwardly, and the other blade arm angles downwardly. Likewise, one blade arm from the second of the pair of blade members angles downwardly, and the other blade arm angles upwardly. Thus, the pair of L-shaped blade members lie in first and second intersecting planes.

According to a second preferred embodiment for a rotatable windmill blade assembly, a pair of rectangular blade members are connected together one above the other. A hub mounting hole is formed through the center of each of the pair of blade members, and a diagonal bend or crease is formed across each blade member so as to be aligned with the hub mounting hole thereof. The pair of blade members are positioned in perpendicular alignment so that the respective coupling holes are axially aligned to receive a common hub therethrough for being coupled to the shalt of a windmill or the like. Prior to securing (e.g., welding) the pair of rectangular blade members to the hub, the blade members are folded along their bend lines. In this case, the opposite ends of the top-most of the pair of blade members are bent upwardly, and the opposite ends of the bottom-most blade members are bent downwardly.

According to a third preferred embodiment, a rotatable compound windmill blade assembly is formed by connecting a pair of individual rotatable windmill blade assemblies one above the other. Each of the pair of rotatable blade assemblies may be either one of the first or second preferred blade assemblies described above. The pair of windmill blade assemblies are connected (e.g., welded) to a common hub received therethrough for being coupled to the shaft of a power generator. The pair of rotatable blade assemblies of the compound assembly are connected to the hub so as to be out of phase (i.e., the assemblies are shifted with respect to one another so that the blade members of the top-most assembly are rotated around the hub relative to the blade members of the bottom-most assembly).

BRIEF DESCRIPTION OF THE DRAWINGS

FIG. 13 shows a pair of rotatable windmill blade assemblies like that shown in FIGS. 7-12 to be connected together to form a rotatable compound windmill blade assembly according to a third preferred embodiment of this invention;

FIG. 14 is a top view showing the pair of rotatable windmill blade assemblies of FIG. 13 connected together to form the rotatable compound windmill blade assembly;

DESCRIPTION OF THE PREFERRED EMBODIMENT

Figure 1:
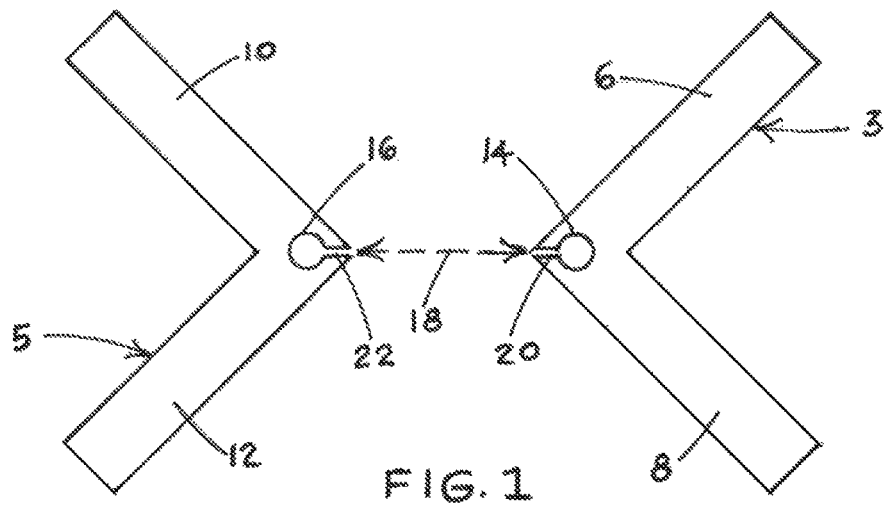
FIG. 1 shows a pair of L-shaped blade members to be connected together to form a rotatable windmill blade assembly according to a first preferred embodiment of this invention.
Figure 2:
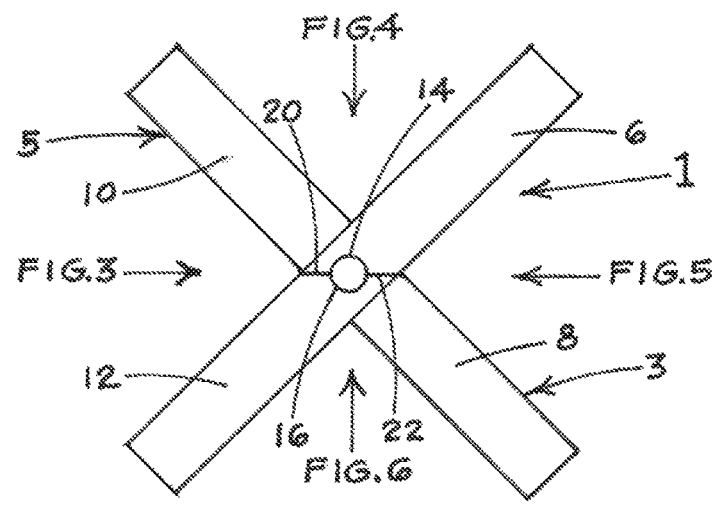
FIG. 2 is a top view showing the pair of L-shaped blade members of FIG. 1 connected together to form the rotatable windmill blade assembly.
Figure 3:
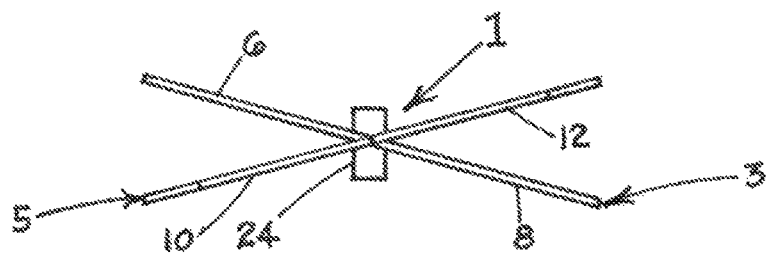
FIG. 3 is a side view of the rotatable windmill blade assembly looking in the direction of the reference arrow 3 of FIG. 2.
Figure 4:
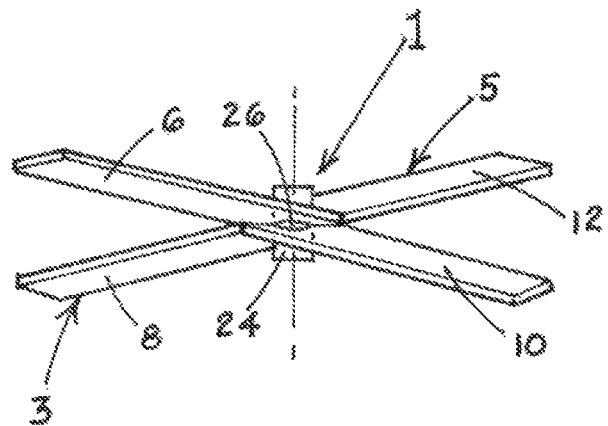
FIG. 4 is a side view of the rotatable windmill blade assembly looking in the direction of the reference arrow 4 of FIG. 2.
Figure 5:
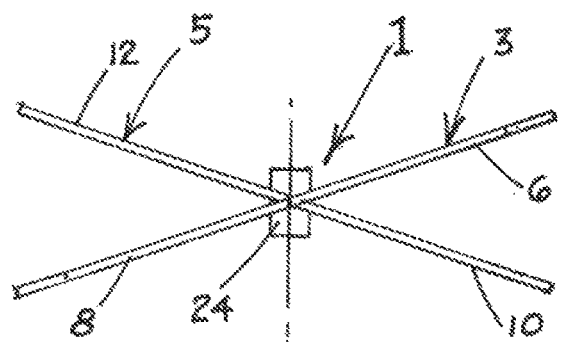
FIG. 5 is a side view of the rotatable windmill blade assembly looking in the direction of the reference arrow 5 of FIG. 2.
Figure 6:
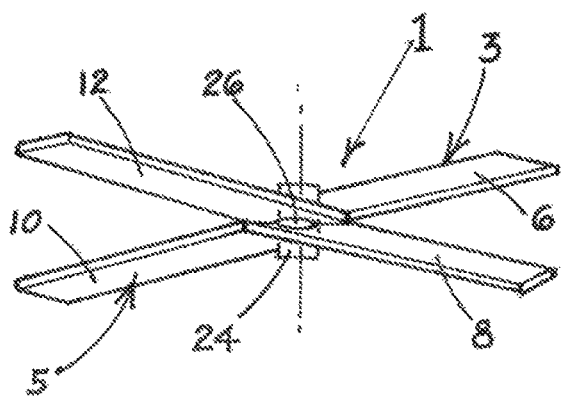
FIG. 6 is a side view of the rotatable windmill blade assembly looking in the direction of the reference arrow 6 of FIG. 2.
Figure 7:
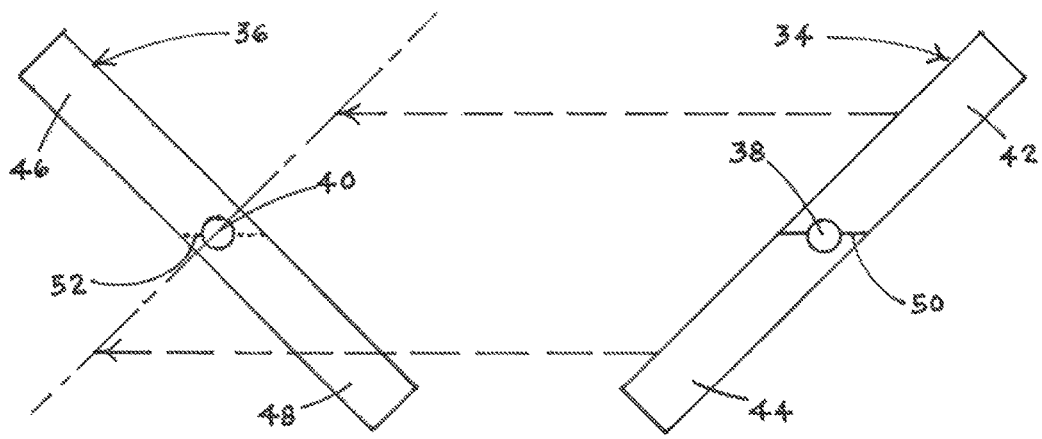
FIG. 7 shows a pair of rectangular blade members to be connected together to form a rotatable windmill blade assembly according to a second preferred embodiment of this invention.
Figure 8:
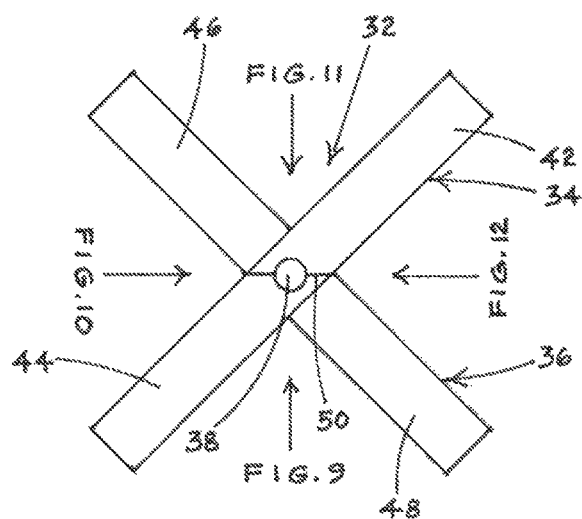
FIG. 8 is a top view showing the pair of rectangular blade members of FIG. 7 connected together to form the rotatable windmill blade assembly.
Figure 9:
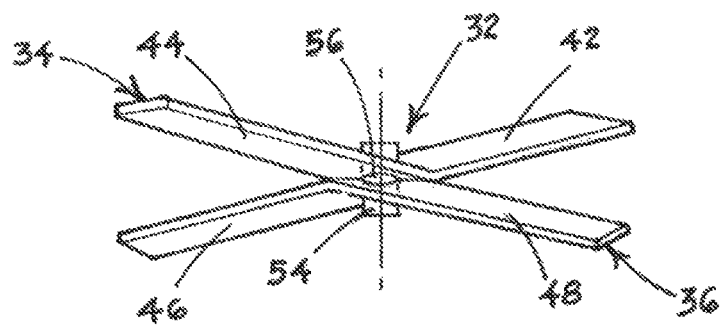
FIG. 9 is a side view of the rotatable windmill blade assembly looking in the direction of the reference arrow 9 of FIG. 8.
Figure 10:
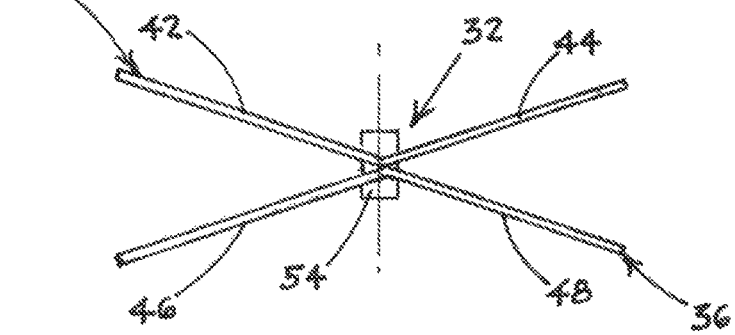
FIG. 10 is a side view of the rotatable windmill blade assembly looking in the direction of the reference arrow 10 of FIG. 8.
Figure 11:
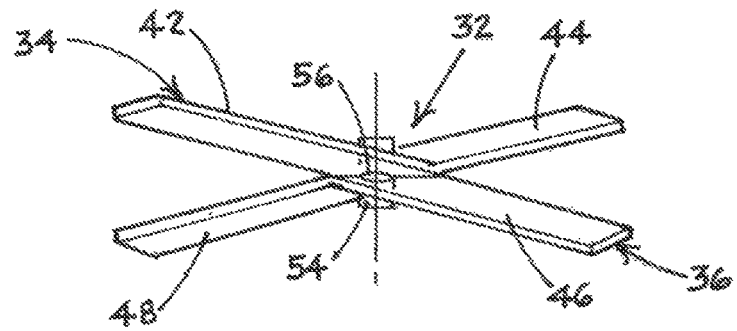
FIG. 11 is a side view of the rotatable windmill blade assembly looking in the direction of the reference arrow 11 of FIG. 8.
Figure 12:
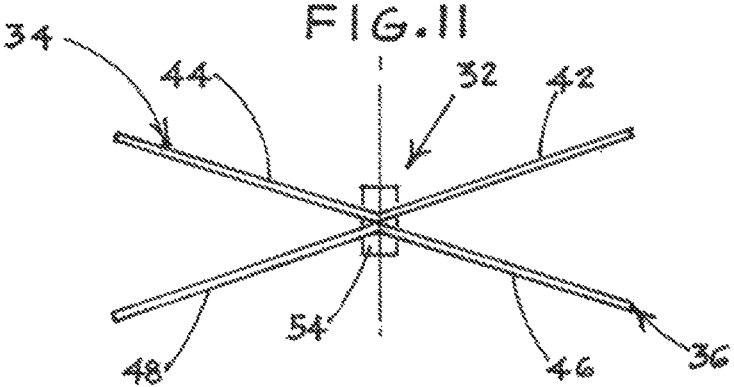
FIG. 12 is a side view of the rotatable windmill blade assembly looking in the direction of the reference arrow 12 of FIG. 8.
Figure 15:
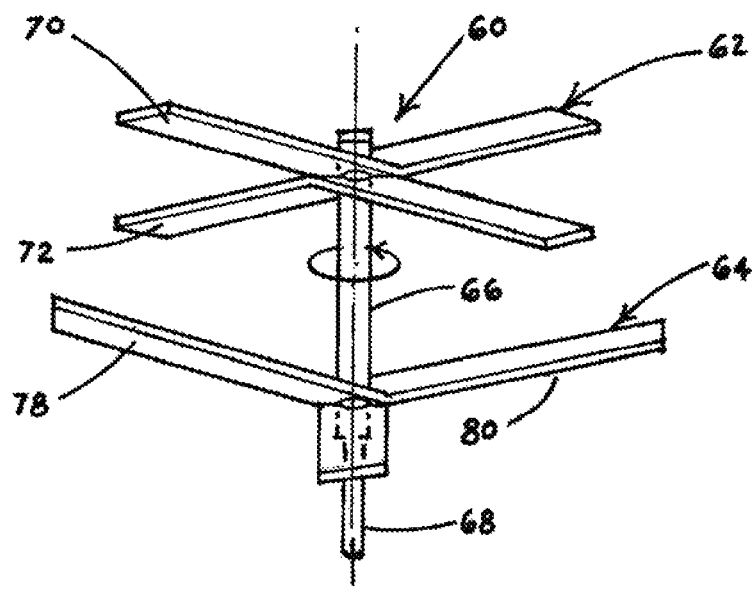
FIG. 15 is a side view of the rotatable compound windmill blade assembly looking in the direction of the reference arrow 15 of FIG. 14.
Figure 16:
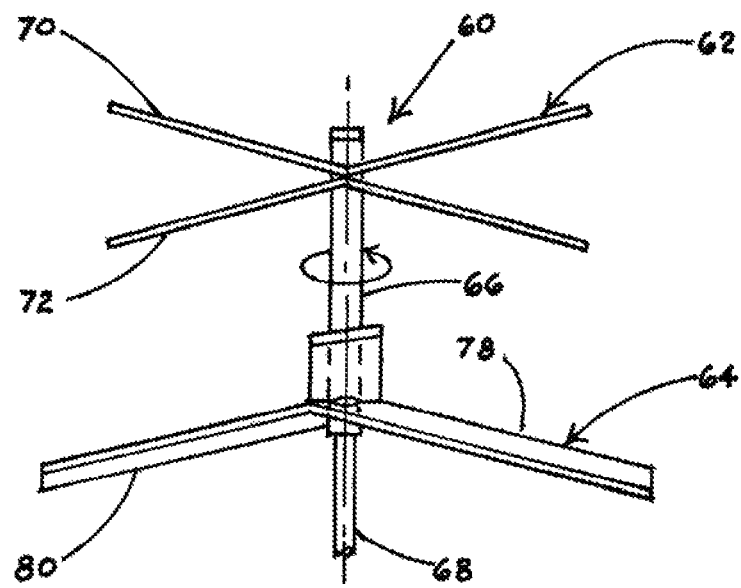
FIG. 16 is a side view of the rotatable compound windmill blade assembly looking in the direction of the reference arrow 16 of FIG. 14.
Figure 17:
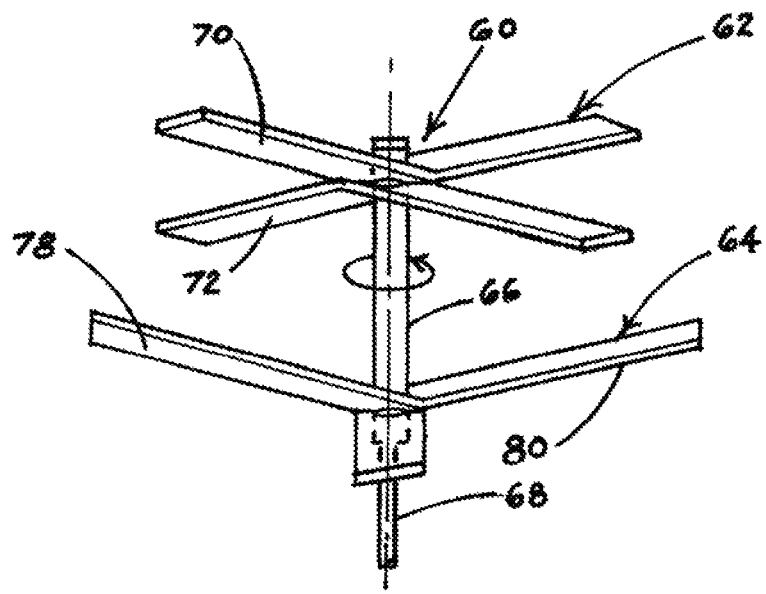
FIG. 17 is a side view of the rotatable compound windmill blade assembly looking in the direction of the reference arrow 17 of FIG. 14.
Figure 18:
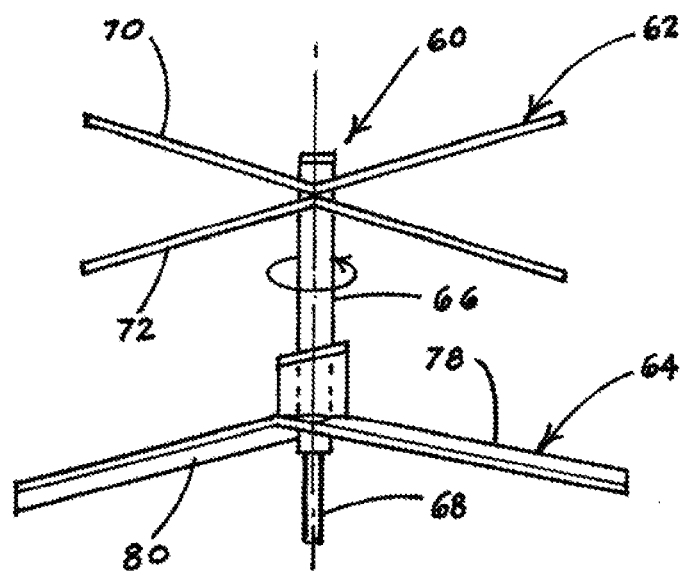
FIG. 18 is a side view of the rotatable compound windmill blade assembly looking in the direction of the reference arrow 18 of FIG. 14.

A first preferred embodiment for a rotatable windmill blade assembly 1 is described while referring concurrently to FIGS. 1-6 of the drawings. The blade assembly 1 is adapted to be rotated in response to a driving force applied thereto by a fluid medium. By way of particular example, the rotatable windmill blade assembly is mounted (in a manner to be explained in greater detail hereinafter when referring to FIGS. 19 and 20) so as to be rotated in response to air flow (i.e., the wind). In this same regard, the rotatable blade assembly 1 can be a wind-driven turbine used to produce useful work such as, for example, generating electricity to power electrical apparatus.

The rotatable windmill blade assembly 1 of FIGS. 1-6 includes a pair of opposing L-shaped blade members 3 and 5. The blade members 3 and 5 are preferably cut from sheet metal for maximum durability when exposed to the elements. However, the precise material from which the blade members 3 and 5 are manufactured is not to be considered a limitation of this invention.

Each of the pair of opposing L-shaped blade members 3 and 5 includes a pair of intersecting blade arms which are aligned perpendicular to one another. Thus, blade member 3 has intersecting blade arms 6 and 8, and blade member 5 has intersecting blade arms 10 and 12. A hub mounting hole 14 and 16 is formed between the blade arms 6, 8 and 10, 12 of each of the blade members 3 and 5. A blade member coupling slot 20 and 22 is also formed in each blade member 3 and 5 where the blade arms 6, 8 and 10, 12 intersect so as to run along a coupling axis (designated 18 in FIG. 1) from the respective hub mounting hole 14 and 16 thereof to the tip or nose at the front of the blade member.

The opposing L-shaped blade members 3 and 5 are connected tip-to-tip to form the blade assembly 1 by pushing blade members 3 and 5 towards one another along the coupling axis 18 as shown in FIG. 1. The blade members 3 and 5 slide towards and into interlocking engagement with one another via the respective coupling slots 20 and 22 thereof. The blade members 3 and 5 are pushed together until the hub mounting hole 14 of blade member 3 is axially aligned with the hub mounting hole 16 of blade member 5 (best shown in FIG. 2). A hollow hub 24 or the like (best shown in FIGS. 3-6) is inserted through the axially-aligned in mounting holes 14 and 16 to prevent a separation of the blade members 3 and 5. The hollow hub 24 also permits the blade assembly 1 to be attached to a rotatable shaft (best shown in FIGs. 19 and 20) so that is rotation of the blade assembly can be used to generate electricity or perform any other useful work. A weld 26 (best shown in FIGS. 4 and 6) is created at the interface of the hub 24 with the blade members 3 and 5 to hold the blade assembly 1 together and maintain the pitch thereof.

That is, with the L-shaped blade members 3 and 5 connected together as just explained, the blade arms 6 and 8 of blade member 3 are coplanar relative to one another. Likewise, the blade anus 10 and 12 of blade member 5 are also coplanar. However, in the fully-assembled blade assembly 1, the blade members 3 and 5 are not coplanar with each other.

More particularly, prior to welding, the blade member 3 is turned with respect to the blade member 5 around the coupling axis 18 of FIG. 1 such that the blade arm 6 of blade member 3 angles upwardly by approximately 15 degrees from the coupling axis 18 and the blade arm 8 angles downwardly front the coupling axis 18 by approximately 15 degrees. The other blade member 5 is turned with respect to the blade member 3 around the coupling axis 18 such that the blade arm 10 of blade member 5 angles downwardly from the coupling axis 18 by approximately 15 degrees, and the blade arm 12 of the blade member 5 angles upwardly from the coupling axis 18 by approximately 15 degrees.

After the L-shaped blade members 3 and 5 have been turned with respect to one another around the coupinig axis 18, the blade arms 6 and 8 of blade member 3 are still coplanar. Likewise, the blade arms 10 and 12 of blade member 5 are still coplanar. However, the blade members 3 and 5 lie in first and second intersecting planes which form an angle therebetween of about 30 degrees. By turning the pair of L-shaped blade members 3 and 5 along the hub 24, the blade assembly 1 is provided with a pitch that is aerodynamically configured to cause the assembly to spin or rotate in response to the wind blowing thereagainst as will be described when referring to FIGS. 19 and 20.

A second preferred embodiment for a rotatable windmill blade assembly 32 is now described while referring concurrently to FIGS. 7-12 of the drawings. Rather than connecting together L-shaped blade members to form the blade assembly 1 of FIGS. 1-6, the blade assembly 32 of FIGS. 7-12 includes a pair of rectangular blade members 34 and 36 which are preferably cut from flexible sheet metal. A hub mounting hole 38 and 40 is formed through the center of each blade member 34 and 36. The blade member 34 has a first blade arm 42 located at one side of its hub mounting hole 38 and a second blade arm 44 located at the opposite side of mounting hole 38. The blade member 36 also has a first blade arm 46 located at one site of its mounting hole 40 and a second blade arm 48 located at the opposite side of its mounting hole. A diagonal bend line or crease 50 and 52 is formed (e.g., crimped) across each of the blade members 34 and 36 so as to be aligned with the respective hub mounting holes 38 and 40 thereof.

The blade members 34 and 36 are connected to one another to form the blade assembly 32 by moving the blade member 34 (in the direction of the reference lines in FIG. 7) atop the blade member 36 until the blade members 34 and 36 are arranged in perpendicular alignment and the hub mounting hole 38 of blade member 34 lies above and in axial alignment with the hub mourning hole 40 of blade member 36. A hollow hub 54 or the like (best shown in FIGS. 9-12) is inserted through the axially-aligned hub mounting holes 38 and 40 to prevent a separation of blade members 34 and 36 and permit the blade assembly 32 to be attached to a rotatable shaft (best shown in FIGS. 19 and 20). A weld 56 (best shown in FIGS. 9 and 11) is created at the interface of the hub 54 with the blade members 34 and 36 to hold the blade assembly 32 together. In the assembled configuration of FIGS. 8-12, the diagonal bend lines 50 and 52 of the blade members 34 and 36 are aligned one atop the other.

Unlike the blade assembly 1 of FIGS. 1-6, the blade arms 42 and 44 of blade member 34 are not coplanar. Likewise, the blade arms 46 and 48 of blade member 36 are not coplanar. That is, prior to their connection to the hub 54, the flexible blade member 34 is bent along its bend line 50, and the flexible blade member 36 is bent along its bend line 52. In this case, the blade arms 42 and 44 of blade member 34 bend in the same upward direction, and the blade arms 46 and 48 of blade member 36 bend in the same downward direction.

More particularly, the blade member 34 that lays above and in perpendicular alignment with the blade member 36 is bent along its fold line 50 such that each of the first and opposite ends 42 and 44 turn upwardly towards one another. The blade member 36 below blade member 34 is bent along its fold line 52 such that each of the first and opposite ends 46 and 48 turn downwardly towards one another. In this same regard, blade members 42 and 44 which turn upwardly bend in opposite directions with respect to blade members 46 and 48 which bend downwardly. Each of the upturned ends 42 and 44 of the top-most blade member 34 makes an angle of, for example, about 30 degrees with respective ones of the downturned ends 46 and 48 of the bottom-most blade member 36. Accordingly, the blade assembly 32 is provided with a pitch that is aerodynamically configured to cause the assembly to spin or rotate in response to the wind blowing thereagainst.

Turning now to FIGS. 13-18 of the drawings, a third preferred embodiment is described for a rotatable compound windmill blade assembly 60. The rotatable compound windmill blade assembly 60 is achieved by connecting a pair of identical blade assembly 62 and 64 one above the other along a common hollow hub 66 (best shown in FIGS. 15-18). A shaft 68 is coupled to the hub 66 whereby the hub and the blade assemblies 62 and 64 connected thereto are adapted to rotate together with the shaft 68 in response to a fluid force (e.g., the wind).

Each of the pair of blade assemblies 62 and 64 which are connected one above the other to form the rotatable compound windmill blade assembly 60 of FIGS. 13-18 is identical to the blade assembly 32 that was previously described when referring to FIGS. 7-12. Therefore, only a brief description of the identical blade assemblies 62 and 64 will be provided. The blade assembly 62 includes a pair of elongated, rectangular blade members 70 and 72 that are connected (e.g., welded) together so that blade member 70 lies over top of and in perpendicular alignment with the blade member 72. A hub mounting hole (only one of which 74 being shown) is formed through the center of each of the blade members 70 and 72 to receive the hollow hub 66 therethrough. A diagonal bend line or crease (only one of which 76 being shown) is formed across each of the pair of blade members 70 and 72 so as to be axially aligned with hub mounting holes 74 thereof.

Likewise, the blade assembly 64 includes a pair of elongated, rectangular blade members 78 and 80 that are welded together so that the blade member 78 lies over top of and in perpendicular alignment with the blade member 80. A hub mounting hole (e.g., 82) is formed through the center of each of the blade members 78 and 80 to receive the hollow hub 66 therethrough. A diagonal bend line or crease (e.g., 84) is formed across each of the pair of blade members 78 and 80 so as to be axially aligned with the hub mounting holes 82 thereof.

As in the case of the rotatable windmill blade assembly 32 of FIGS. 7-12, the opposite ends of the top-most blade member 70 of the blade assembly 62 turn upwardly along the bend line 76 towards one another, and the opposite ends of the bottom-most blade member 72 of blade assembly 62 turn downwardly along the bend line (not shown) running thereacross towards one another. In this same regard, the opposite ends of the top-most blade member 78 of the blade assembly 64 turn upwardly along the bend line 84 towards one another, and the opposite ends of the bottom-most blade member 80 turn downwardly along the bend line (not shown) running thereacross towards one another.

The pair of blade assemblies 62 and 64 are connected to the common hub 66 to form the rotatable compound windmill blade assembly 60 such that the blade assembly 62 is located above and spaced from the blade assembly 64. What is more, the position of the upper-most blade assembly 62 on the hub 66 is rotated with respect to the position of the lower-most blade assembly 64, such that the blade members 70 and 72 of blade assembly 62 are out of phase or shifted by 45 degrees relative to the blade members 78 and 80 of blade assembly 64. This arrangement prevents the downwardly turned ends of the blade member 72 of blade assembly 62 from contacting the upwardly turned ends of the blade member 78 of the blade assembly 64.

Figure 19:
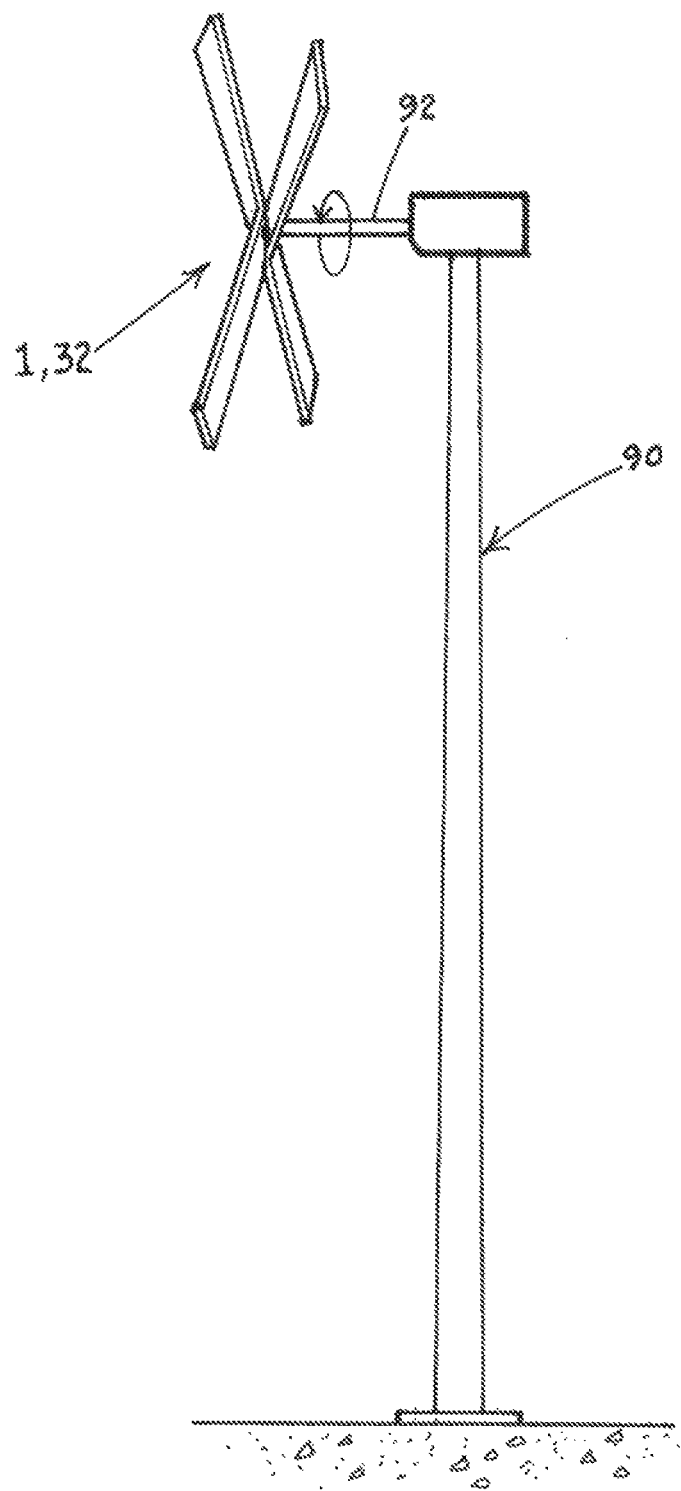
FIG. 19 shows the rotatable windmill blade assembly of either one of FIG. 1-6 or 7-12 coupled to an electrical power generator.
Figure 20:
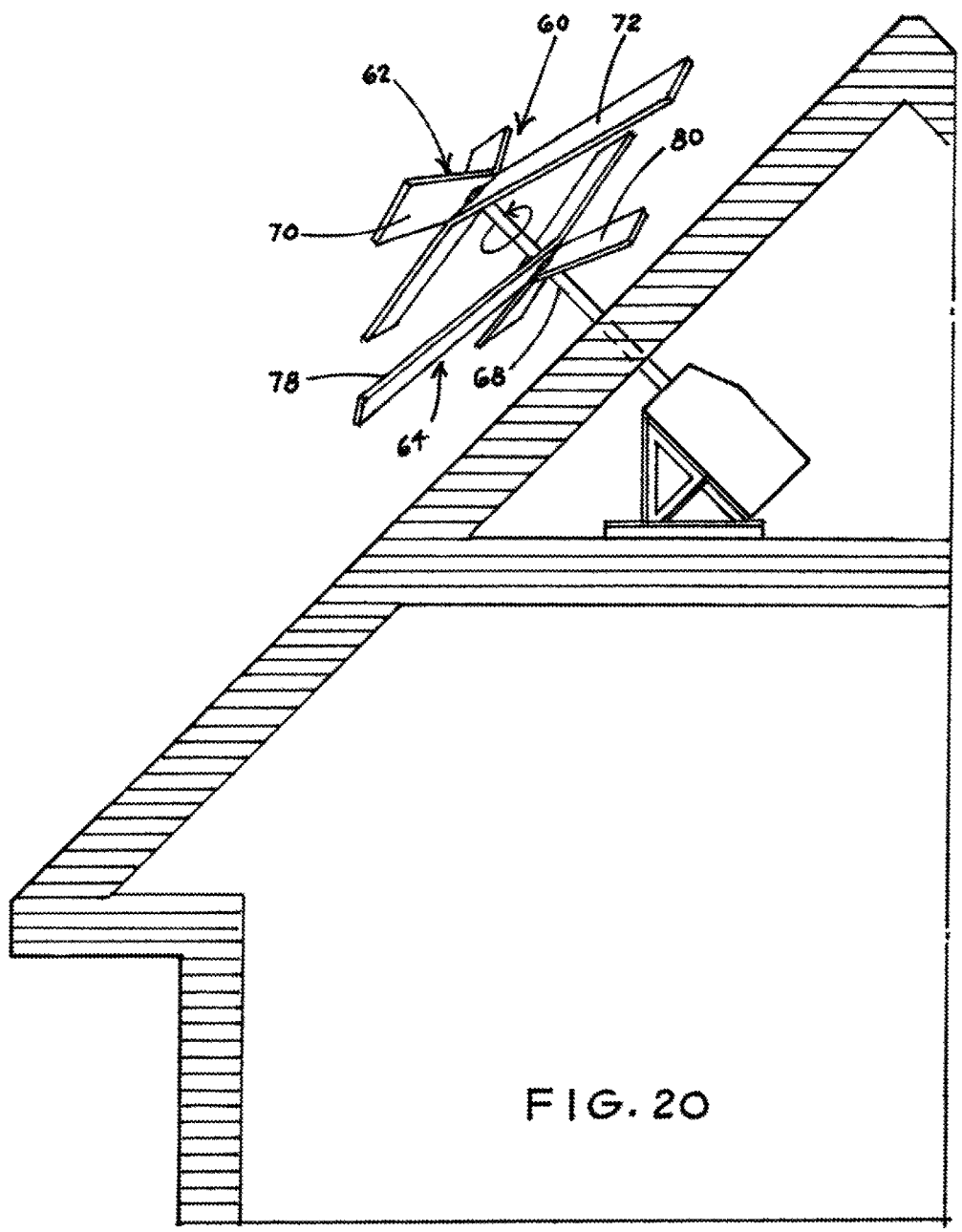
FIG. 20 shows the rotatable compound windmill blade assembly of FIGS. 13-18 coupled to an electrical power generator.

FIGS. 19 and 20 of the drawings illustrate applications for the rotatable blade assemblies 1, 32 and 60 shown in FIGS. 1-18. In the example of FIG. 19, either the rotatable blade assembly 1 (of FIGS. 1-6) or the rotatable blade assembly 32 (of FIGS. 7-13) can be coupled to a conventional windmill 90 shown in FIG. 19. However, the compound blade assembly 60 (of FIGS. 14-18) can also be coupled to the windmill 90. In a preferred embodiment, the windmill 90 is of the type commonly found in windy outdoor areas and adapted to generate electricity in response to a rotation of the blade assembly 1, 32. The blade assembly 1 or 32 is coupled to the windmill 90 by means of a rotatable shaft 92 that is received by the hollow hub 24 of the rotatable blade assembly 1 or the hollow hub 54 of the rotatable blade assembly 32.

In the example of FIG. 20, the rotatable compound windmill blade assembly 60 is shown coupled to a conventional electrical generator 96 for household use. In a preferred embodiment, the generator 96 is located in an attic of a house, and the blade assembly 60 is connected to the roof at which to face and rotate in response to the wind. However, either one of the individual rotatable windmill blade assembles 1 or 32 of FIGS. 1-12 can be used in substitution of the compound blade assembly 60. The blade assembly 60 is coupled to the generator 96 through the roof by means of the shaft 68 that is received through the hollow hub (designated 66 in FIGS. 15-18) to which the pair of blade assemblies 62 and 64 are connected one above the other.

The invention claimed is:
1. A rotatable windmill blade assembly adapted to spin in response to the wind so as to generate a corresponding rotational force for producing work, said rotatable blade assembly comprising:

a first L-shaped blade member having a first pair of intersecting blade arms and a hub mounting hole formed therethrough at the intersection of said first pair of blade arms;

a second L-shaped blade member having a second pair of intersecting blade arms and a hub mounting hole formed therethrough at the intersection of said second pair of blade arms;

each of said first and second L-shaped blade members having a blade member connecting slot located at the intersection of the respective first and second pairs of intersecting blade arms and communicating with respective ones of the hub mounting holes thereof, the blade member connecting slots of said first and second L-shaped blade members being aligned with one another along a coupling axis running therebetween;

said first and second L-shaped blade members being movable towards one another along said coupling axis such that the blade member connecting slots of said L-shaped blade members are slidably received in interlocking engagement one within the other and the respective hub mounting holes are moved into axial alignment with one another; and a hub extending through the axially-aligned hub mounting holes of said first and second L-shaped blade members.

2. The rotatable windmill blade assembly recited in claim 1, wherein said first L-shaped blade member is rotated relative to said second L-shaped blade member around said coupling axis.

3. The rotatable windmill blade assembly recited in claim 2, wherein said second L-shaped blade member is rotated relative to said first L-shaped blade member around said coupling axis.

4. The rotatable windmill blade assembly recited in claim 3, wherein each of said first and second L-shaped blade members are held by said hub in first and second intersecting planes, such that one of the blade arms from each of said first and second pairs of intersecting pairs of blade arms forms an angle with and lies above said coupling axis and the other of the blade arms from each of said first and second intersecting pairs of blade arms forms an angle with and lies below said coupling axis.

5. The rotatable windmill blade assembly recited in claim 1, further comprising a rotatable shaft coupled between said hub and a generator that is adapted to generate electricity when said blade assembly is spinning.

6. The rotatable windmill blade assembly recited in claim 5, wherein the first and second pairs of intersecting blade arms of said first and second L-shaped blade members form the blades of a windmill.

7. A rotatable windmill blade assembly adapted to spin in response to the wind so as to generate a corresponding rotational force for producing work, said rotatable blade assembly comprising:

a first blade member having first and opposite ends and a hub mounting hole located between said first and opposite ends thereof;

a second blade member having first and opposite ends and a hub mounting hole located between said first and opposite ends thereof;

said first and second blade members positioned one above the other so that the respective hub mounting holes thereof are in axial alignment;

each of the first and opposite ends of said first blade member bending upwardly, and each of the first and opposite ends of said second blade member bending downwardly and away from the first and opposite ends of said first blade member;

a bend line running across each of said first and second blade members between the first and opposite ends thereof so as to be aligned with the respective hub mounting holes thereof, said first blade member being bent upwardly and said second blade member being bent downwardly along respective ones of said bend lines; and a hub extending through the axially-aligned hub mounting holes of said first and second blade members.

8. The rotatable windmill blade assembly recited in claim 7, wherein each of said first and second blade members is rectangular, said bend lines running diagonally across said rectangular blade members such that the bend line of said first blade member and the bend line of said second blade member are aligned one above the other.

9. The rotatable windmill blade assembly recited in claim 7, further comprising a rotatable shaft coupled between said hub and a generator that is adapted to generate electricity when said blade assembly is spinning.

10. The rotatable windmill blade assembly recited in claim 9, wherein the first and second blade members form the blades of a windmill.

11. A rotatable compound blade assembly for a windmill adapted to spin in response to the wind so as to generate a corresponding rotational force for producing work, said rotatable compound blade assembly comprising:

a first blade assembly including a first blade member having first and opposite ends that intersect one another along a first bend line and a hub mounting hole located therebetween and extending through said first bend line and a second blade member lying below said first blade member and having first and opposite ends that intersect one another along a second bend line and a hub mounting hole located therebetween and extending through said second bend line, the first and opposite ends of said first blade member bending upwardly along said first bend line, and the first and opposite ends of said second blade member bending downwardly along said second bend line and away from the first and opposite ends of said first blade member;

a second blade assembly lying below said first blade assembly and including a first blade member having first and opposite ends that intersect one another along a third bend line and a hub mounting hole located therebetween and extending through said third bend line and a second blade member lying below said first blade member and having first and opposite ends that intersect one another along a fourth bend line and a hub mounting hole located therebetween and extending through said fourth bend line, the first and opposite ends of said first blade member of said second blade assembly bending upwardly along said third bend line towards said first blade assembly, and the first and opposite ends of said second blade member of said second blade assembly bending downwardly along said fourth bend line and away from the first and opposite ends of said first blade member of said second blade assembly;

said first and second blade assemblies positioned one above the other so that the respective hub mounting holes thereof are in axial alignment, and each of the first and second blade members of said first blade assembly is aligned out of phase with each of the first and second blade members of said second blade assembly; and a hub extending through the axially aligned hub mounting holes of each of said first and second blade members of each of said first and second blade assemblies.

12. The rotatable compound blade assembly recited in claim 11 further comprising a rotatable shaft coupled between said hub and a generator that is adapted to generate electricity when said compound blade assembly is spinning.

\* \* \* \* \*